United States Patent [19]
Hubner

[11] 3,786,326
[45] Jan. 15, 1974

[54] STARTING CIRCUIT FOR A SYNCHRONOUS MACHINE HAVING AN ELECTRONIC COMMUTATOR

[75] Inventor: Klaus Hubner, Erlangen, Germany

[73] Assignee: Siemens Aktiengesellschaft, Munich, Germany

[22] Filed: Aug. 17, 1972

[21] Appl. No.: 281,556

[30] Foreign Application Priority Data
Aug. 17, 1971 Germany.................. P 21 41 120.1

[52] U.S. Cl................................ 318/138, 318/439
[51] Int. Cl............................................ H02r 5/40
[58] Field of Search................... 318/138, 191–193, 318/198, 227, 345, 439

[56] References Cited
UNITED STATES PATENTS
3,392,318  7/1968  Huntzinger....................... 318/138
3,678,352  7/1972  Bedford............................ 318/138

*Primary Examiner*—Bernard A. Gilheany
*Assistant Examiner*—W. E. Duncanson, Jr.
*Attorney*—Hugh A. Chapin

[57] ABSTRACT

A starting circuit for a synchronous machine having controlled semi-conductors in the individual winding circuits of the machine is disclosed in which at least one auxiliary circuit connected in parallel to the windings is used. The auxiliary circuit comprises a capacitor which prior to operation of the circuit, is charged to a voltage opposite to the conducting voltage of the winding thyristors. An auxiliary thyristor connected to conduct in the same direction as the winding thyristors is connected in series with the capacitor and a diode of opposite polarity is connected in parallel to the auxiliary thyristor.

When a winding thyristor is to be cut off the auxiliary thyristor is triggered to conduct thereby causing the capacitor to discharge through the conducting winding thyristor thereby placing a negative cut off voltage on this thyristor and cutting off any further conduction of the thyristor.

3 Claims, 9 Drawing Figures

STARTING CIRCUIT FOR A SYNCHRONOUS MACHINE HAVING AN ELECTRONIC COMMUTATOR

BACKGROUND OF THE INVENTION

1. Field of the Invention

This invention is concerned with a starting circuit for a synchronous machine fed with an impressed d-c current, and having a commutator of controlled semiconductor rectifiers (thyristors) in the individual winding circuits.

2. Description of the Prior Art

In operating synchronous machines of the type involved in this invention, called converter motors, the reactive power for the converter is made available by the machine itself. This occurs provided the customary design of the machine permits the machine to rotate at a sufficient speed of rotation above approximately 10 percent of its nominal speed and provided, upon the firing of each successive thyristor, the machine voltage is sufficient to commutate the machine current from the winding through which the current is flowing, to the next winding. Below this machine speed the machine voltage is too low to extinguish the prior current-carrying thyristor when the next thyristor is cyclically fired, so that a commutation short circuit would occur unless special starting aids are provided. The known starting aids are expensive and depend on various parameters, such as, for example, the line frequency, machine frequency, etc.

It is an object of the invention to create a starting circuit of the kind mentioned above, which is of simple design and operates independently of such parameters.

SUMMARY OF THE INVENTION

According to the invention, the stated problem is solved by providing at least one auxiliary circuit with the commutator which comprises a capacitor connected with an auxiliary voltage source to make available a charging voltage and to cover the charge-reversal losses. Additionally a rectifier arrangement is connected in series therewith and consists of a diode and a parallel connected, reverse polarity auxiliary thyristor connected to the discharging circuit of the capacitor. The discharging circuit only contains the current-carrying winding circuit, whereby the winding circuit is controlled and forced into conduction in synchronism with one thyristor of the commutator.

After the machine has reached sufficient speed so that the machine voltage assures proper commutation, the starting circuit can be disconnected, preferably in reliance upon the speed. According to the invention the starting circuit is here based on the use of additive extinction, known from the control of choppers. This principle is applicable with a reduced expenditure for circuitry, because elements of the converter motor are used over again as parts of an additive extinction circuit.

BRIEF DESCRIPTION OF THE DRAWINGS

Further details of the invention will be explained more fully in the following with the aid of two examples of embodiments shown in a simplified manner in the drawings in which there is shown in:

FIG. 1b, a six-pulse converter motor, and in

DESCRIPTION OF THE PREFERRED EMBODIMENTS

Figure 1A:
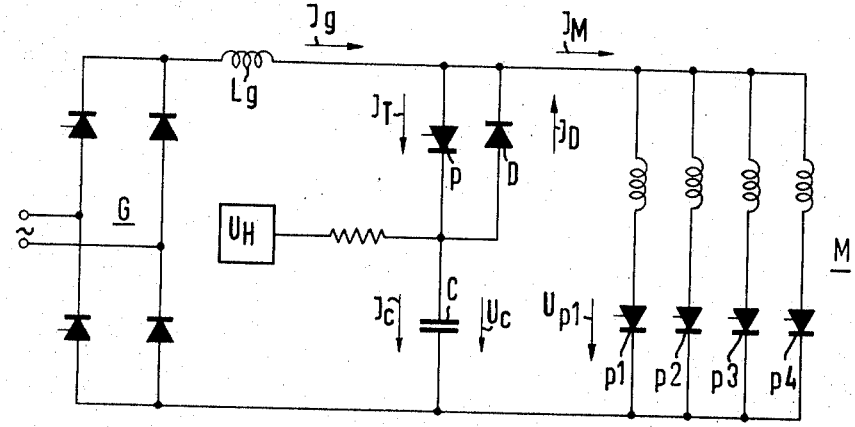
FIG. 1a, a four-pulse converter motor.

According to FIG. 1a, an intermediate d-c circuit with a smoothing choke Lg, having the stator windings of the convertor motor M connected to it by the respective thyristors, $p1$ to $p4$, is also connected to an a-c fed, single-phase, half-controlled rectifier bridge G. Connected in shunt with the winding circuits is an auxiliary circuit comprising a capacitor C in series with a diode D and an auxiliary thyristor p connected in reverse polarity and in parallel to the diode. Also connected between the auxiliary thyristor p and the capacitor C is an auxiliary voltage source $U_H$ which prior to operation charges the capacitor to a charging voltage $U_k$ and thereby compensates for the charge-reversal losses during starting. The stator windings of the converter motor have a stray inductance $L_\sigma$. The load or motor current, $J_g$, is held essentially constant by the smoothing choke $L_g$.

Figure 2:
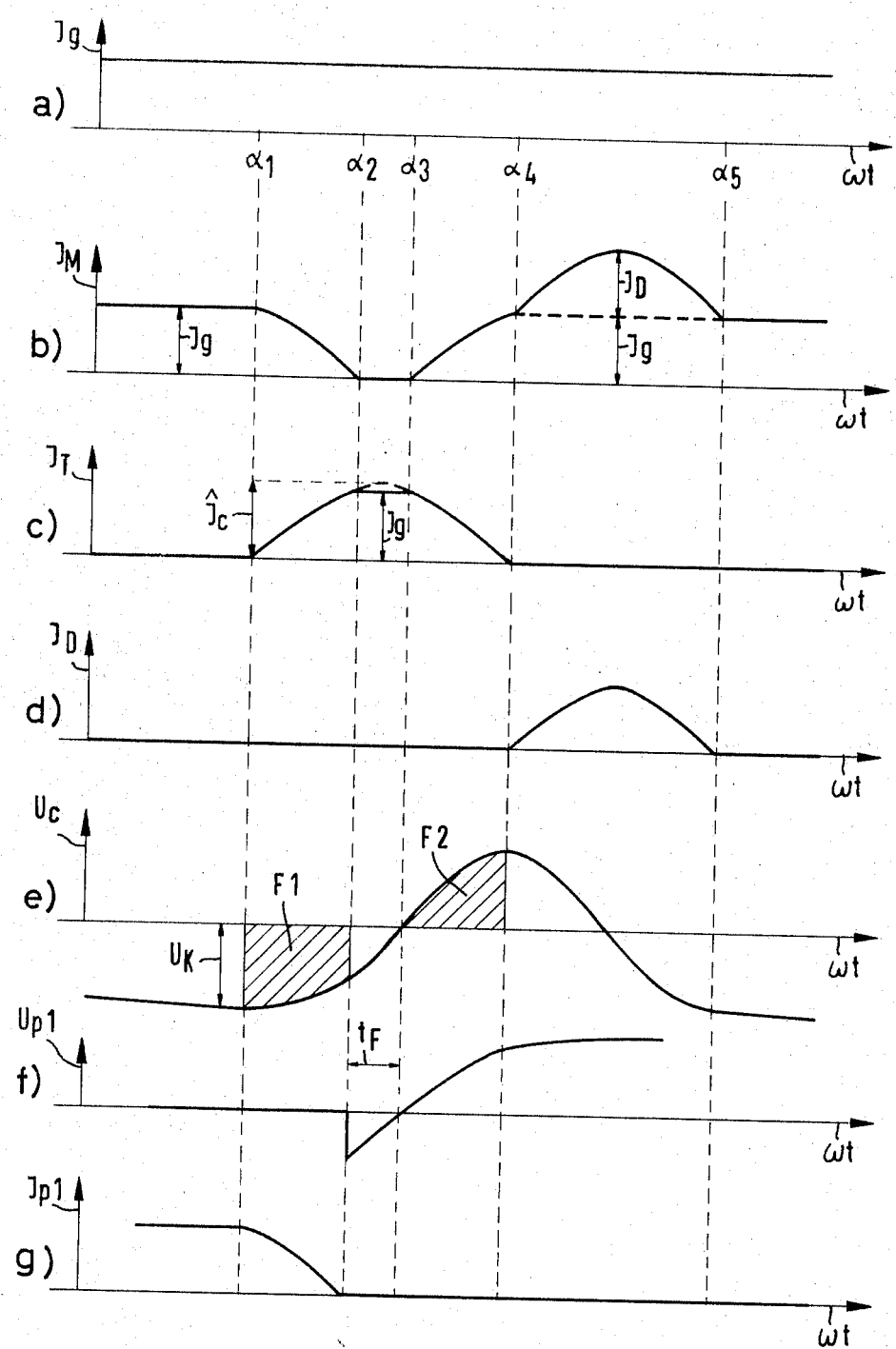
FIG. 2a to 2g, current and voltage curves.

At operating speeds of $n > 0.1$ to $0.2\ n_N$ the converter motor is commutated in the known manner by the machine voltage. At lower operating speeds the auxiliary circuit is connected in a manner not shown. It may be assumed, that the thyristor $p1$ is in its conductive condition and that the thyristor $p2$ will be fired with an appertaining firing control circuit. If the auxiliary thyristor p is triggered simultaneously with the firing of the thyristor $p2$ at the point in time $\alpha_1$ (FIG. 2a), the capacitor C, which is charged by the auxiliary voltage source $U_H$ to the negative voltage $U_K$ (FIG. 2e), discharges through the current-conducting thyristor $p1$ and the fired auxiliary thyristor p. According to FIG. 2c, a sinusoidal counter-current Ic flows with an amplitude $\hat{I}c = U_K \sqrt{L_\sigma / C}$. This current, through appropriate proportioning of the voltage $U_K$ and the capacity C, is larger than the charging current Jg. The counter-current Jc reduces the motor current $J_M$ (FIG. 1a) until the latter becomes zero at the point in time $\alpha_2$, so that the thyristor $p1$ is cut off. At that time $\alpha_2$ (FIGS. 2e, f) the negative voltage $U_c$ remaining at the capacitor C acts as a negative cut-off voltage at the thyristor $p1$ (FIG. 2f). The charge on the capacitor C is now reversed through the conducting of the auxiliary thyristor and the constant load current Jg (FIG. 2a) until, according to FIG. 2e, the voltage $U_c$ becomes zero at the time $\alpha_3$. The time interval between $\alpha_1$ and $\alpha_2$ corresponds to the recovery time of the commutator thyristor to be extinguished (for instance, $p1$). From the time $\alpha_3$ on, the capacitor C is charged in an increasingly positive manner. According to FIG. 2b, the load current, Jg, in the machine winding associated with the thyristor $p2$, is also being built up with the increasing capacitor voltage, until at the point in time $\alpha_4$ the machine current $J_M$ reaches the value Jg and the capacitor current Jc becomes zero.

In this explanation, the counter-voltage of the converter motor at the very low starting speeds is neglected as a first approximation. For the shaded voltage-time areas (FIG. 2e) one has $F_1 = F_2 = \int u\, dt = L_\sigma Jg$. From the point in time $\alpha 4$ on, the voltage $U_c$ of the positively charged capacitor C reverses through the diode D, the machine winding and the series-connected thyristor $p2$, until at time $\alpha_5$, it has the polarity and magnitude $U_K$ necessary for extinguishing the current-carrying thyristor. The losses occurring during the charge reversal are covered here by the auxiliary voltage source $U_K$, which charges the capacitor C to the voltage $U_K$ at the initial starting of the motor.

The charge-reversal losses, $U_c\alpha_4 = U_c\alpha_5 < U_K$ due to the necessary reserve of voltage-time area from $\alpha 2$ to $\alpha 3$ (recovery time of the thyristor to be extinguished) are here neglected.

The entire commutation time, including the reversal process ($\alpha_1$ to $\alpha_5$), is $\tau_K \approx 2\pi L_o C$.

The repetition frequency of the commutations is $f_K = f p$, where $f$ is the motor frequency and $p$ the number of pulses of the inverter.

For the required torque uniformity, the currentless time of the motor ($J_M = 0$) should be as short as possible. Here the equation $1/f_k \approx 1/(10 \cdot f \cdot p)$ applies.

With $\hat{J}_c = U_k \sqrt{L_\sigma/C}$, the magnitude of the voltage $U_K$ and the capacity C can be determined therefrom.

Figure 1B:
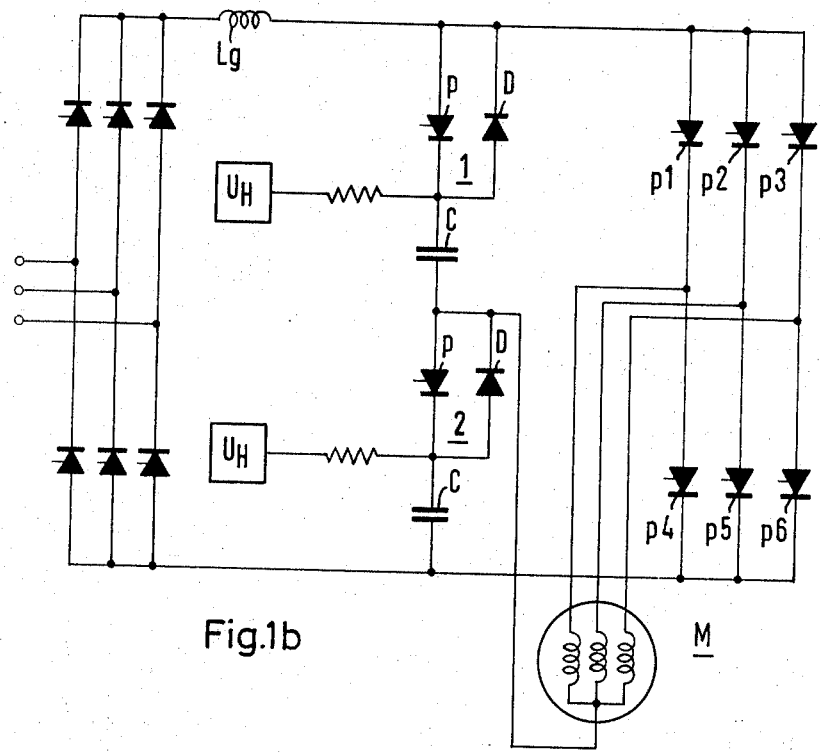

In order to eliminate the possibility of objectionable, currentless state of the motor during commutation, and to obtain a torque, even though smaller at the shaft during the commutation, it is advantageous to provide, in a six-pulse converter circuit according to FIG. 1b, two auxiliary circuits 1 and 2, and specifically, one for each half-bridge p1 to p3 and p4 to p6 of the machine winding circuits. By this connection, during commutation in one half of the bridge, the load current in the other half of the bridge can continue to flow unimpeded.

The d-c voltage source may also be a battery or an uncontrolled or, as shown, fully controlled rectifier bridge.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A starting circuit for a synchronous machine having an impressed d-c input and a commutator having at least two thyristors in the individual winding circuits of which the first thyristor is conducting and the second is not, said circuit comprising:

at least one auxiliary circuit connected in parallel to the winding circuits comprising capacitance means.

an auxiliary voltage means removably connected to the capacitance means to charge the capacitance means, prior to the operation of the auxiliary circuit, to a voltage opposite to the conducting voltage of the semi-conductor rectifier in the individual winding circuits a rectifier circuit connected in series with the capacitor comprising an auxiliary control means having the same conducting polarity as the rectifiers in the windings, to conduct upon the triggering of the second of the controlled rectifiers in the winding circuits, and a diode of opposite polarity to the auxiliary thyristor, connected in parallel to the auxiliary thyristor, and control means to trigger the second thyristor and the auxiliary thyristor whereby the capacitance means discharges through the first thyristor and the auxiliary thyristor, thereby applying a negative voltage to the thyristor to cut off the first thyristor.

2. A starting circuit for a synchronous machine having an impressed d-c input and a commutator having at least two thyristors in the individual winding circuits as in claim 1 in which the capacitance means comprises a capacitor, and the auxiliary voltage means is a battery.

3. A starting circuit for a synchronous machine having an impressed d-c input and a commutator having at least two thyristors in the individual winding circuits as in claim 1 in which at least two auxiliary circuits are used with the machine winding circuits, one for each half bridge of the machine winding circuits.

* * * * *